Nov. 11, 1947. A. VAN RYAN 2,430,838
PROTECTING MEANS FOR ELECTRICAL INSTRUMENTALITIES
Filed Nov. 29, 1943 2 Sheets-Sheet 2
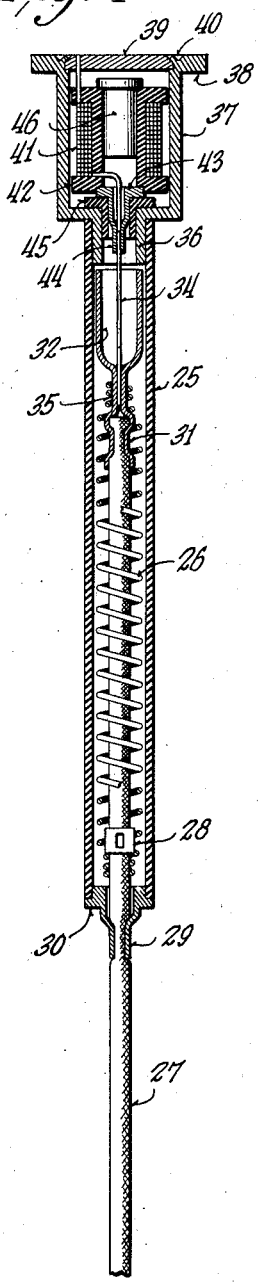
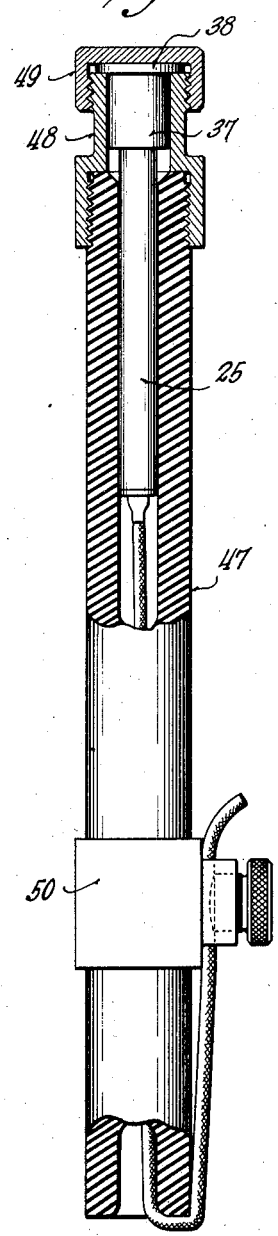
INVENTOR.
ANTHONY VAN RYAN
BY
ATTORNEY.

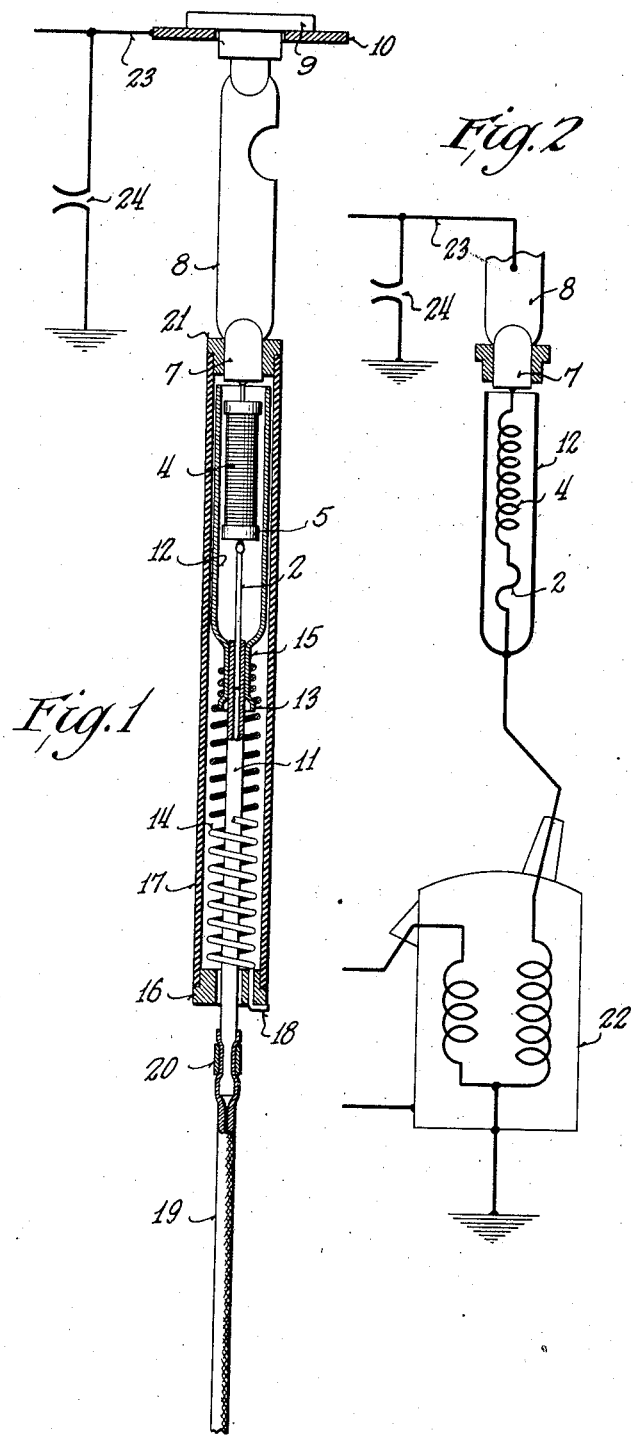
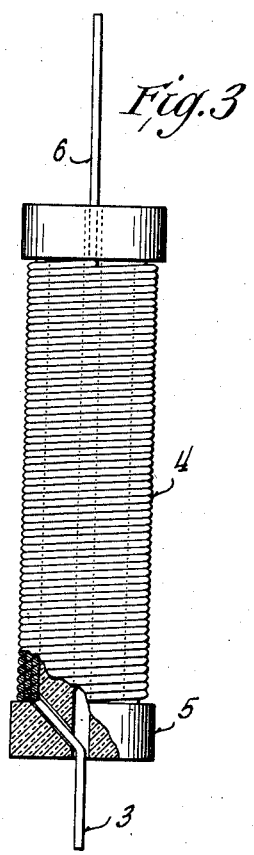

Patented Nov. 11, 1947

2,430,838

UNITED STATES PATENT OFFICE 2,430,838

PROTECTING MEANS FOR ELECTRICAL INSTRUMENTALITIES

Anthony Van Ryan, South Milwaukee, Wis., assignor to Kyle Corporation, South Milwaukee, Wis., a corporation of Wisconsin Application November 29, 1943, Serial No. 512,132

3 Claims. (Cl. 200—115)

This invention relates to protecting means for electrical instrumentalities.

In protecting electrical instrumentalities such, for example, as transformers, it is the usual practice to install a fuse link in the circuit between the primary of the transformer and the power line, which power line is usually of relatively high voltage. It is also the customary practice to provide a lightning arrester or spark gap adjacent the transformer and bridged between the power line and the ground. This gap is usually set at a relatively high voltage, for example 50,000 volts impulse for a 9 kv. arrester, and is adapted to break down on a lightning surge and provide a by-pass to the ground. However, it has been found that when a fuse link of the proper capacity, corresponding to the maximum capacity of the transformer or other electrical instrumentality, is employed, this fuse link is frequently ruptured due to a lightning surge and consequently it has been the practice to provide fuse links having a capacity several times that of the transformer. Thus it is not possible under the present practice to adequately protect the transformer and yet guard against needless and frequent blowing of the fuse.

This invention is designed to overcome the above noted defects, and objects of this invention are to provide protecting means, such as a fuse construction for example, and a system of protection whereby the fuse is protected against surges and yet is of approximately the right value for adequately protecting the transformer or other electrical instrumentality, and to provide a construction which is very simple and which may be used in the ordinary systems and with the ordinary equipment without requiring any alteration of the system or equipment.

Specifically, further objects are to provide a novel composite fuse link construction which is so made that an inductance is placed in series with the fuse link and the inductance and fuse link are by-passed by a conducting path having an auxiliary spark gap therein of much lower break-down value than the main spark gap or lightning arrester, the inductance and the small or auxiliary spark gap being so proportioned that under surge conditions the inductance will cause sufficient voltage to build up across the auxiliary spark gap to insure discharge across the auxiliary spark gap and around the bridging path without rupture of the fuse link, to thereby afford surge protection for the fuse link.

Further objects are to provide fuse links of the pre-tensioned type which may be substituted for standard fuse links in the standard equipment and which are relatively simple in construction and are easy to produce and in which fusible sections of the appropriate current carrying capacity for the instrumentality to be protected are used and yet in which such fusible sections are protected against surges, the construction in no way interfering with the normal functioning of the fuse links.

Embodiments of the invention are shown in the accompanying drawings, in which:

Figure 1 is an enlarged sectional view through a fuse link.

Figure 2 is a diagrammatic view showing the manner in which the fuse link is connected in the circuit.

Figure 3 is an enlarged view of the choke coil with a portion of the spool and coil broken away.

Figure 4 is a sectional view through a further form of fuse link.

Figure 5 shows the fuse link in position within a fuse tube.

Referring to Figures 1 to 3, it will be seen that the fuse link comprises a fusible element 2. The upper end of the fusible element is connected to the lower end 3 of an inductance coil or choke coil 4 which is wound on an insulating spool 5. The other end of the coil indicated at 6 is connected to the rounded base 7 of the rigid portion 8 of the fuse link. The fuse link terminates in an upper button head 9 and may be provided with a conducting washer or adapter 10 if desired. The lower end of the fusible element 2 is clamped within the end of a small conducting metal tube 11. Around the upper end of the tube 11 a larger metal tube or shell 12 has its lower end crimped and rigidly secured to the upper end of the tube 11.

The extreme lower end of the tube 12 is slightly flared as indicated at 13. This is accomplished by crimping the lower end of the tube 12 at a point slightly above its lower end. The inductance coil or choke coil 4 is positioned within the metal tube 12 as shown. If desired, the tube 12 may be made of magnetic material to increase the inductance of the coil 4.

A tension spring 14 loosely surrounds the tube 11 and has its upper end contracted around the reduced portion 15 of the tube 12 and has its lower portion extending through a cap 16 which loosely fits within and closes the lower end of a fiber tube 17. The lower end of the spring is outwardly turned as indicated at 18 so as to secure the lower end of the spring in place. The cap 16 is provided with an aperture materially larger than the tube 11 so that the tube 11 is free to slide downwardly through the cap 16 when the fuse link is ruptured. A flexible leader 19 extends from the lower end of the conducting tube or rod like member 11 downwardly. It may be held to the tube 11 in any suitable manner as by means of the clamping member 20 which is crimped around the leader and tube 11.

The upper end of the fiber tube 17 is closed by a cap 21 through which the rounded portion 7 of the rigid part 8 of the fuse link extends. The cap 21 loosely fits within the upper end of the fiber tube 17. It is to be noted that the upper edge of the metal tube 12 is spaced a slight, accurately predetermined distance from the lower peripheral corner portions of the enlarged part 7 of the fuse link. Thus it is apparent that the metal tube and the portion 7 provide a gap which is arranged in a circuit bridging the inductance coil 4 and the fusible element 2. This is diagrammatically shown most clearly in Figure 2. The composite fuse link is adapted to be mounted within a fuse tube, as shown for the second form of the invention in Figure 5 for instance, and the lower end of the leader is connected to the lower terminal of the fuse structure.

In practice the lower end of the fuse link is connected to an electrical instrumentality, such as the primary of the single bushing transformer indicated at 22 in Figure 2. The upper end of the fuse link is connected to the power line 23 and a common type of gap or lightning arrester 24 extends between the power line and the ground thus forming a second bridging circuit around the electrical instrumentality and the inductance and the small gap.

The gap between the metal sleeve 12 and the portion 7 is made relatively small, much smaller than the gap 24.

If a lightning surge occurs, it is apparent that the surge current will jump the gap between the members 7 and 12 and will be by-passed around the inductance and the fusible section of the fuse link and will, therefore, be prevented from blowing the fuse. It will be noted that the inductance 4 causes a sufficiently high voltage drop when a surge occurs on the power line to cause the gap between the members 7 and 12 to break down and thus to provide a bridging path around the inductance and the fusible section of the fuse link.

In view of the fact that most of the lightning surges are of very short duration, it is apparent that by by-passing the surge current, the fuse line is prevented from blowing under average lightning surge conditions. On the other hand, a steady overload of sufficient value to blow the fuse link will not produce the relatively high voltage rise in the inductance coil 4 and consequently will not build up a high enough voltage to cause the current to jump the gap between the members 7 and 12, but instead will cause the blowing of the fusible section of the fuse link. It is apparent also that if a surge voltage of sufficient value to jump the gap 24 occurs on the power line, such gap will function in the normal manner and although the surge voltage may be relatively high, if the surge itself is of short duration the surge current will also be by-passed around the fusible element and inductance coil in the manner hereinabove described and will not rupture the fuse link.

If the fuse link is ruptured on continued overload, it is apparent that the spring 14 will suddenly draw the tube 11 downwardly together with the sleeve 12 and will quickly rupture the circuit within the small fiber tube 17. In the event of a heavy overload, it is apparent that there is an expulsion action in the main fuse tube within which the composite fuse link is mounted. This expulsion action will cause the leader and any remaining portion of the fuse link and metal sleeve 12 and the fiber tube 17 to be blown outwardly through the open end of the fuse tube.

From the description hereinabove given, it is apparent that this invention provides surge protection for an electrical instrumentality and also provides means for protecting such electrical instrumentality against continued overload.

It is to be noted from reference to Figures 1 and 3 that the heads of the spool 5 are larger than the outside diameter of the coil 4 and consequently the coil is prevented from coming into contact with the metal tube or sleeve 12 under any condition.

It is to be noted further that by means of this construction a very accurate spacing of the tube 12 from the portion 7 may be obtained to thereby determine with accuracy the precise voltage at which the gap formed by the members 12 and 7 will break down. The break-down voltage of the gap between the members 7 and 12 is much lower than that of the standard gap 24.

It is to be noted that the members 8 and 11 are terminal like members and that the conducting portion 7 is carried by one terminal like member and the conducting portion 12 by the other terminal like member. It is also to be noted that the fuse link is pre-tensioned and that the spring 14 which produces this pre-tensioning also has the additional function of interrupting the bridging path by extending the gap between the members 12 and 7 when the fuse link is ruptured on overload.

The invention may take other forms. In the form of the invention shown in Figures 4 and 5 the fiber tube is indicated by the reference character 25. Within this fiber tube the tension spring 26 is positioned. The lower end of the tension spring is secured to the leader 27 below a clamping member 28 and the leader is clamped by the constricted portion 29 of a metal closure cap 30 for the fiber tube 25. This closure cap 30 loosely closes the lower end of the fiber tube 25. The upper end of the leader 27 is clamped by the crimped portion 31 of the metal tube or shield 32 and the lower end of the fusible element 34 is secured within the crimped portion 35 of the metal sleeve 32. The upper end of the spring 26 is crimped around the crimped portion 35 of the metal tube or shield 32.

The upper end of the fiber sleeve 25 loosely slips over a reduced extension 36 of a mild steel cylinder 37. The upper end of the cylinder 37 terminates in an outwardly projecting annular flange 38 and the cylinder is closed by means of a metal cap 39 which has a tapered peripheral surface and which seats on the shouldered portion of the steel cylinder 37 as shown. A portion of the upper end of the cylinder 37 is swaged over at a plurality of points. For example, prick punch holes 40 may be formed as shown in Figure 4 so as to lock the metal cap 39 in place. This metal cap may be of brass, copper, or other good conducting material or, if desired, it could be made of steel.

An inductance coil or choke coil indicated at 41 is wound on an insulating spool 42. The lower end of the inductance coil extends into a metal member 43 which has a flanged upper end and a tubular downwardly projecting extension indicated at 44. It is passed through a flanged insulating bushing 45 as indicated in Figure 4. The lower end of the tubular extension 44 receives the lower terminal of the coil 41 and the fusible element 34 and is crimped thereto. Within the spool 42 a mild steel plunger 46 is positioned. It will be seen that the cylindrical magnetic plunger 46 and the magnetic shell 37 materially increase the inductance of the coil 41. The upper end of the inductance coil is electrically connected to the plate 39.

It is to be noted that the upper edge of the metal shield or tube 32 is spaced an accurately predetermined small distance from the lower edge of the reduced, downwardly extending portion 36 of the steel sleeve or shell 37 and thus provides an accurately predetermined small gap. The gap is in a circuit which is bridged around the inductance coil 41 and the fusible element 34 and thus serves to by-pass surge current in the manner hereinbefore described.

The composite fuse link may be readily mounted within a standard type of insulating fuse tube such as indicated at 47 in Figure 5 or in any other suitable fuse tube. The steel cylinder 37 fits within the hollow brass head 48 of the fuse tube and the flanged portion 38 rests upon the upper edge of the reduced portion of the head 48 as indicated in Figure 5. The head of the fuse link is clamped in place in any suitable manner as by means of the screw cap 49. The lower end of the leader extends out of the lower open end of the fuse tube and is secured in any suitable manner to the lower terminal 50 of the fuse tube 47. The operation of this form of the invention is identically the same as that previously described. The fiber sleeve 25 fits loosely within the tube 47 and on violent overloads this tube and the leader and any remaining portion of the fuse link together with the metal sleeve 32 are blown from the main fuse tube 47.

It is apparent that when the fuse link blows in either form of the invention on a continued overload, the gap at the upper end of the metal sleeve 12 or 32 is very much elongated as the sleeve will then have been moved downwardly through the action of the tension spring.

The voltage drop across the coil is relatively small at line frequency. However, when a surge occurs, the voltage drop across the coil is high and the device will then spark at the auxiliary gap or small gap of the circuit which by-passes the coil and the fusible element of the fuse link.

The blowing of an ordinary fuse link occurs during the time the surge voltage is rising to the flash-over value of the lightning arrester. In the type of fuse link forming the subject matter of this invention this initial surge is carried across the small gap provided in the fuse link hereinbefore described.

It will be seen, therefore, that a novel system of surge protection has been provided by this invention which protects the fusible element of a fuse link although the fusible element may be of comparatively small current carrying capacity. It will also be seen that this surge protection in no way interferes with the normal action of the fuse link.

It will also be seen that no new equipment is required and that the surge protected fuse link can be installed in standard equipment without any change whatsoever.

It is to be noted particularly that by this invention it is possible to use a fuse link having a fusible element of a current carrying capacity suitable for the instrumentality to be protected with assurance that the fuse link will be adequately protected against blowing due to surges on the power line.

Although this invention has been described in considerable detail, it is to be understood that such description is intended as illustrative rather than limiting, as the invention may be variously embodied and is to be interpreted as claimed.

I claim:

1. A composite fuse link arranged for insertion into a fuse tube and protected against surges comprising a cylindrical, flanged, metallic end portion formed of magnetic material, an inductance coil within said end portion, an insulating tubular member extending from said end portion, a conducting shell located within said tubular member and having one end in close proximity to said metallic end portion to form a gap, a fusible element within said conducting shell having one end connected to said conducting shell at a point remote from said metallic end portion and having the other end connected to one end of said inductance coil, the other end of said inductance coil being connected to said metallic end portion, said conducting shell and said gap forming a normally open bridging circuit by-passing said fusible element and inductance coil.

2. A composite fuse link arranged for insertion into a fuse tube and protected against surges comprising a cylindrical, flanged, metallic end portion formed of magnetic material, an inductance coil within said end portion, a magnetic core within said inductance coil, an insulating tubular member extending from said end portion, a conducting shell located within said tubular member and having one end in close proximity to said metallic end portion to form a gap, a fusible element within said conducting shell having one end connected to said conducting shell at a point remote from said metallic end portion and having the other end connected to one end of said inductance coil, the other end of said inductance coil being connected to said metallic end portion, said conducting shell and said gap forming a normally open bridging circuit by-passing said fusible element and inductance coil.

3. A composite fuse link arranged for insertion into a fuse tube and protected against surges comprising a cylindrical, flanged, metallic end portion formed of magnetic material, an inductance coil within said end portion, an insulating tubular member extending from said end portion, a conducting shell located within said tubular member and having one end in close proximity to said metallic end portion to form a gap, a fusible element within said conducting shell having one end connected to said conducting shell at a point remote from said metallic end portion and having the other end connected to one end of said inductance coil, the other end of said inductance coil being connected to said metallic end portion, said conducting shell and said gap forming a normally open bridging circuit by-passing said fusible element and inductance coil, and spring means for drawing said conducting shell away from said metallic end portion upon rupture of said fusible element.

ANTHONY VAN RYAN.

REFERENCES CITED

The following references are of record in the file of this patent:

UNITED STATES PATENTS

| Number | Name | Date |
|---|---|---|
| 662,466 | Sachs | Nov. 27, 1900 |
| 1,575,736 | Conrad | Mar. 9, 1926 |
| 1,988,683 | Diehl | Jan. 22, 1935 |
| 2,174,476 | Pittman et al. | Sept. 26, 1939 |
| 2,174,477 | Pittman et al. | Sept. 26, 1939 |
| 2,305,394 | Smith, Jr. | Dec. 15, 1942 |
| 2,305,436 | McMorris | Dec. 15, 1943 |
| 2,371,969 | MacCarthy et al. | Mar. 20, 1945 |